(No Model.)

B. WEBER.
TIRE

No. 558,132.   Patented Apr. 14, 1896.

Witnesses:
S. H. Irish
F. M. Eggleston

Inventor
Bruno Weber
by Redding & Kiddle
Attys

UNITED STATES PATENT OFFICE.

BRUNO WEBER, OF CHICAGO, ILLINOIS, ASSIGNOR TO THE POPE MANUFACTURING COMPANY, OF PORTLAND, MAINE, AND HARTFORD, CONNECTICUT.

TIRE.

SPECIFICATION forming part of Letters Patent No. 558,132, dated April 14, 1896.

Application filed June 21, 1895. Serial No. 553,553. (No model.)

*To all whom it may concern:*

Be it known that I, BRUNO WEBER, a citizen of the United States, residing in the city of Chicago, county of Cook, State of Illinois, have invented certain new and useful Improvements in Tires, of which the following is a specification, reference being had to the accompanying drawings, forming a part hereof.

In the manufacture of pneumatic tires for velocipedes and other vehicles, particularly of what are known as "hose-pipe" tires, which are made up with rubber in a soft state and are subsequently vulcanized, the "valve-cot," as that part is termed by which provision is made for the inflation and deflation of the tire, is usually put in place during the formation of the tube, its projecting web or flange being overlapped by some of the outer layers or plies, whereby a close union of parts is effected and all leakage absolutely prevented. It sometimes happens, however, that it is desired to apply the valve-cot after the tire is completed or to insert a new one in place of the original, which is occasionally sheared off by the creeping of the tire upon the rim of the wheel. Hitherto it has been extremely difficult to make a joint between the new valve-cot and the tire which would be perfectly tight, and it has been practically impossible to make a joint which would remain tight for any considerable length of time when the wheel is in use. Having this difficulty in mind, and being aware of the importance of enabling valve-cots to be applied not only readily but with a permanently tight joint, I have devised the herein described improvements in the method of applying the valve-cot to the tire and in the tire as the product of that method, whereby a tight and durable joint is readily made.

Figure 1:
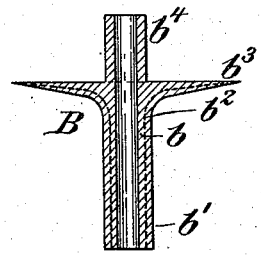
Figure 2:
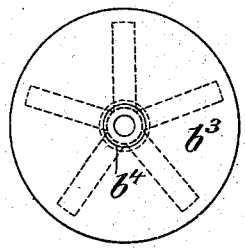
Figure 3:
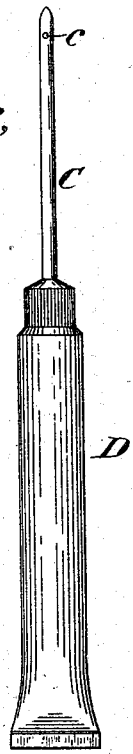
Figure 4:
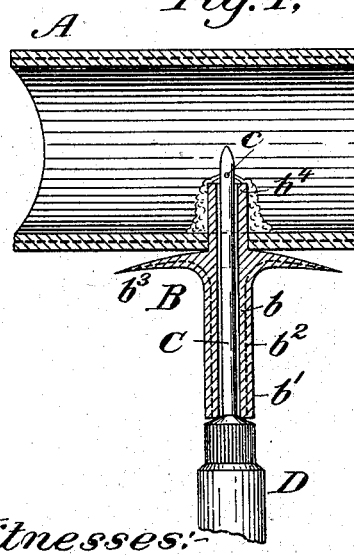
Figure 5:
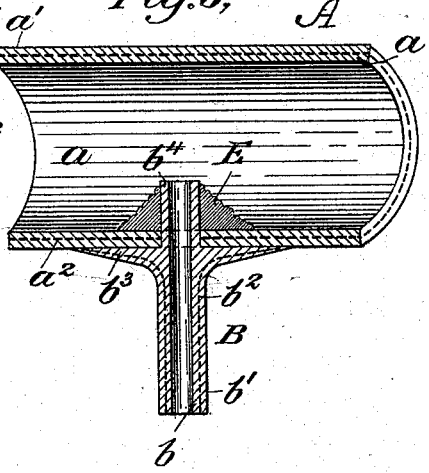

In the accompanying drawings, forming a part hereof, Figure 1 is a central longitudinal section of a valve-cot. Fig. 2 is an end view of the same. Fig. 3 is an elevation of an appliance for introducing the cement as hereinafter set forth. Fig. 4 is a sectional view of a short length of tire and of the valve-cot, illustrating an intermediate step. Fig. 5 is a similar view showing the joint as finally completed.

The particular construction of the tire with which my invention is employed is not material; but the tire A represented in Figs. 4 and 5 of the drawings is of the usual construction, having an inner layer $a$ of rubber, an outer layer $a'$ of rubber, and an intermediate layer (indicated by the dotted line $a^2$) of a suitable fabric. This construction may be considered to represent all pneumatic tires having an inner surface of rubber or other analogous material to which a suitable cement will adhere closely, making therewith an impervious and strong joint.

The valve-cot B may also be of ordinary construction, that represented in the drawings comprising an inner tube $b$ of rubber, an outer tube $b'$ of similar material, and an intermediate tube or lining $b^2$ of a suitable fabric, the said intermediate tube being split from one end for a short distance and spread out, as represented by dotted lines in Fig. 2, while the material of the outer tube $b'$ is also spread out and augmented to form a web or flange $b^3$. The inner tube $b$ is continued beyond the flange $b^3$ to form the neck or stem $b^4$ of the valve-cot. The valve-cot thus formed does not differ from that which has been in use with pneumatic tires, except that the neck or stem $b^4$ is longer than usual, for a purpose presently to be described.

In carrying into effect the improved method with tires and valve-cots of the construction indicated a smooth round hole is formed in the tire either by cutting or by the insertion of a heated wire or rod, the diameter of the hole being such as to receive the neck or stem $b^4$ of the valve-cot with a close fit. The neck or stem of the valve-cot and preferably also the edges of the hole in the tire are then treated with a suitable cement or with naphtha or benzene for the purpose of softening the rubber, so that the parts in contact may be firmly cemented together, and the neck or stem of the valve-cot is introduced into the hole. The proximate faces of the web or flange $b^3$ and of the tire may also at this time or subsequently be treated with cement or with naphtha or benzene in like manner, so that they may be caused to adhere with as much firmness as possible. The joint thus formed between the valve-cot and the tire is reasonably strong, but might not withstand the great pressure brought to bear from within in the ordinary use of the wheel, combined with the constant movement which would tend to separate the neck of the valve-cot from the edges of the hole in which it is cemented. Accordingly I propose, as a safeguard against such separation and as an absolute preventive of leakage around the stem or neck of the valve-cot, to apply a considerable body of cement around the stem of the valve-cot from within after the cot has been placed in position, as described. The tire being hermetically closed at every point except at the valve-cot, I introduce the cement, of any suitable character, through the bore of the cot and cause it to gather in a conical ring or mass surrounding the inwardly-projecting portion of the stem of the cot, substantially as represented at E in Fig. 5. In order that this mass may have a sufficient thickness and body, the stem of the cot is given the increased length referred to above. The cement used for this purpose is preferably a quick-setting rubber cement, which will accumulate around the stem of the cot without spreading too much over the interior of the tire, and in order that it may gather around said stem in the proper manner it is introduced through the cot from below, with the parts held in the position shown in Fig. 4, so that it shall fall over the extremity of the cot.

Any suitable means may be employed for the introduction of the cement, but in order that the bore of the cot may not become clogged therewith I prefer to employ a hollow needle C, having lateral apertures, as at c, and of such a length that the apertures, when the needle is introduced into the cot, shall stand slightly above the extremity of the cot, as clearly represented in Fig. 4. For convenience the needle C may be attached directly to a collapsible tube D, which contains the cement in a fluid or plastic condition.

It will be evident that not only can the valve-cot be easily and quickly applied in the manner described, but that the ring of cement surrounding the stem of the cot, being practically homogeneous and adhering closely to the stem of the cot and to the interior of the tube, practically unites the cot in one structure with the tire, and that no separation can take place either between the cot and the tire or between the mass of cement and the surfaces to which it adheres, no matter how protracted or how severe may be the use to which the tire is subjected. On the contrary, the cement is so distributed that the pressure of the confined air on its surface tends rather to press the cement more firmly against the stem of the cot and against the inner surface of the tire.

What I claim, and desire to secure by Letters Patent, is—

1. The combination with a pneumatic tire, of a valve-cot having its stem inserted through the wall of said tire and projected within the same, and a mass of cement adhering to the stem of the cot and to the inner surface of the tire and surrounding said stem within the tire, substantially as shown and described.

2. The combination with a pneumatic tire of a valve-cot having its stem inserted through the wall of said tire and projected within the same, and a mass of cement adhering to the stem of the cot and to the inner surface of the tire and forming a conical ring about said stem, substantially as shown and described.

3. The method of applying valve-cots to pneumatic tires which consists in making a hole through the wall of the tire, inserting the stem of the valve-cot therethrough and allowing it to project within the tire, introducing cement from below upwardly through the bore of the cot and allowing it to fall over and accumulate around the inwardly-projecting stem of the cot to form about the same a conical ring adhering to said stem and to the inner surface of the tire, substantially as described.

This specification signed and witnessed this 18th day of June, A. D. 1895.

BRUNO WEBER.

Witnesses:
OLIVER B. JACKSON,
R. B. SWIFT.